(No Model.) 2 Sheets—Sheet 1.
E. EGGLESTON.
MAP.
No. 421,684. Patented Feb. 18, 1890.
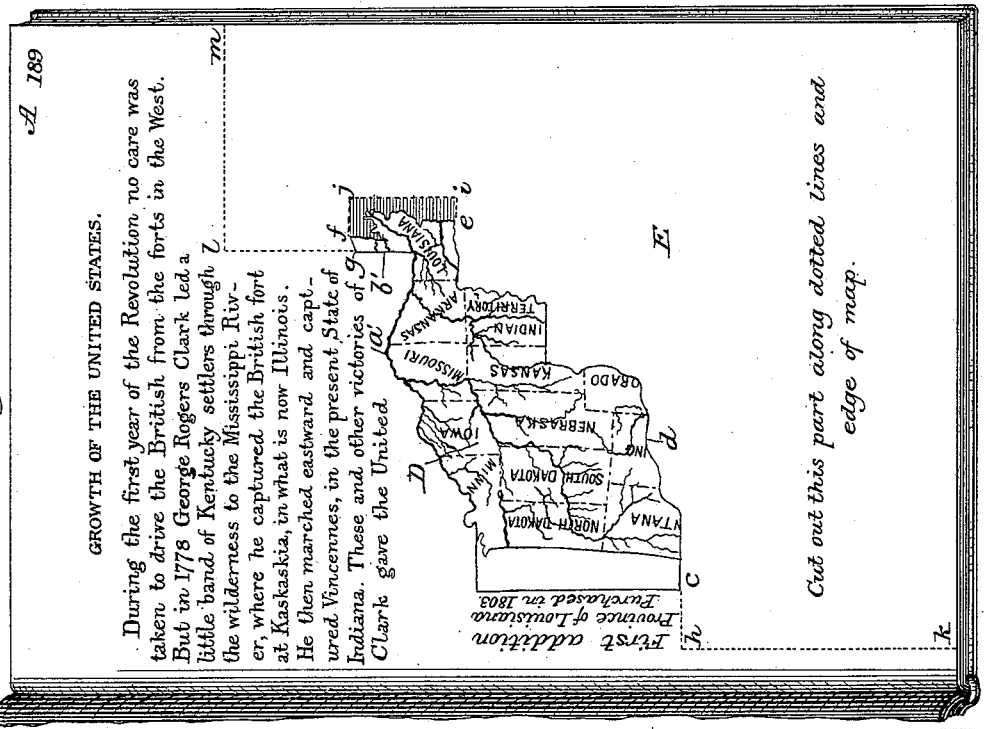
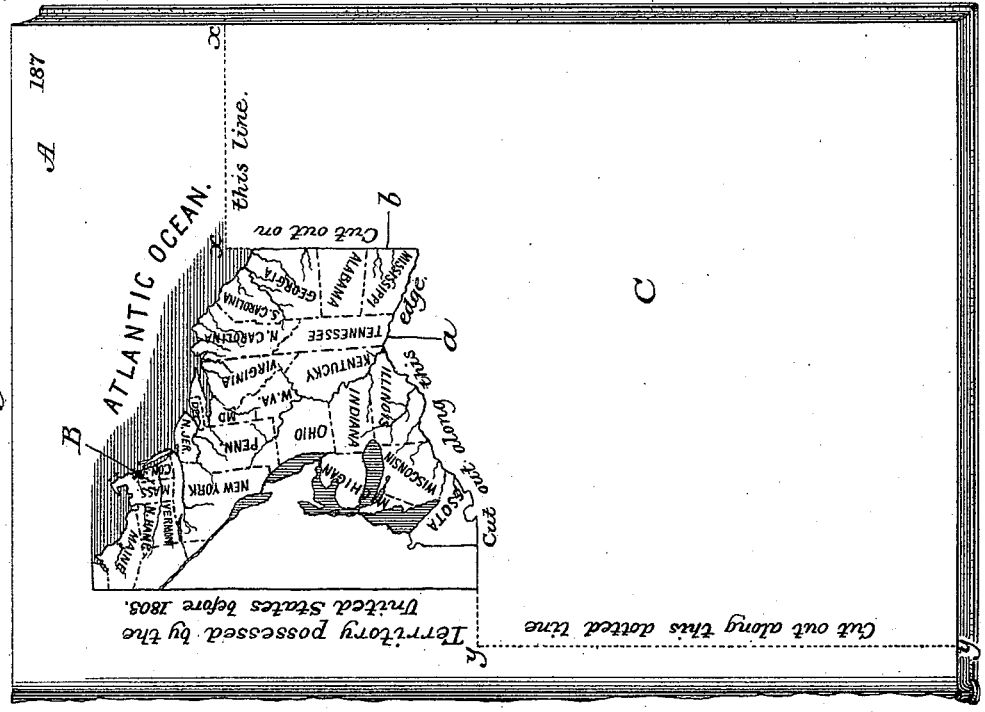
Attest:
A. N. Jesbera
E. M. Watson
Inventor:
Edward Eggleston
By David A. Burr
Atty.

(No Model.) 2 Sheets—Sheet 2.
E. EGGLESTON.
MAP.
No. 421,684. Patented Feb. 18, 1890.
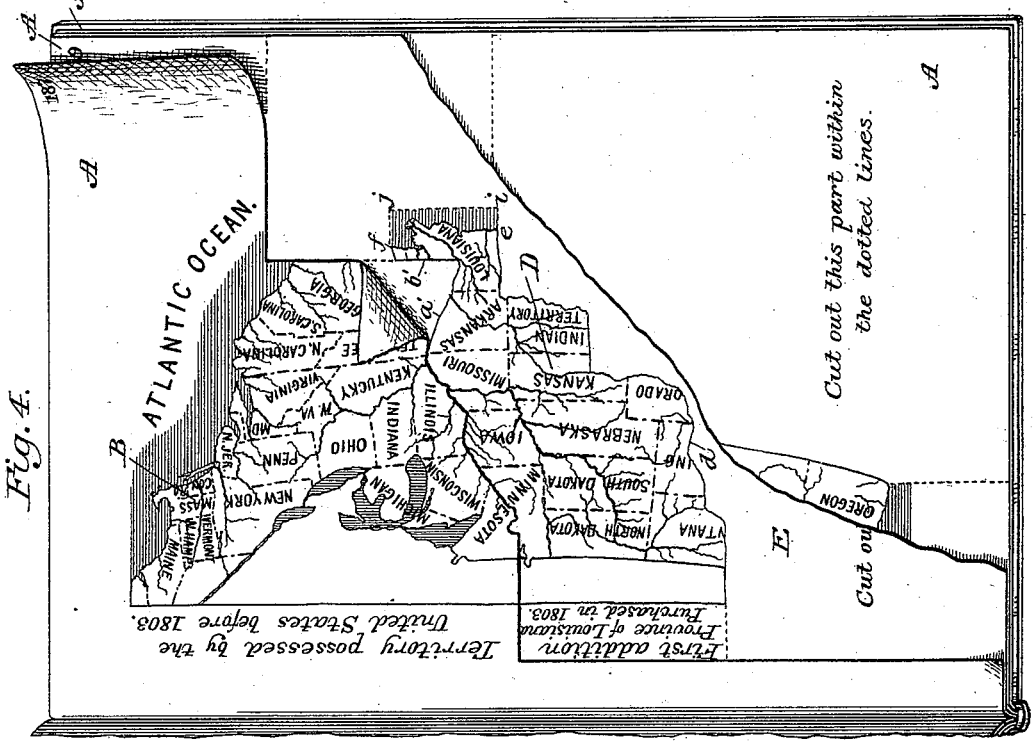
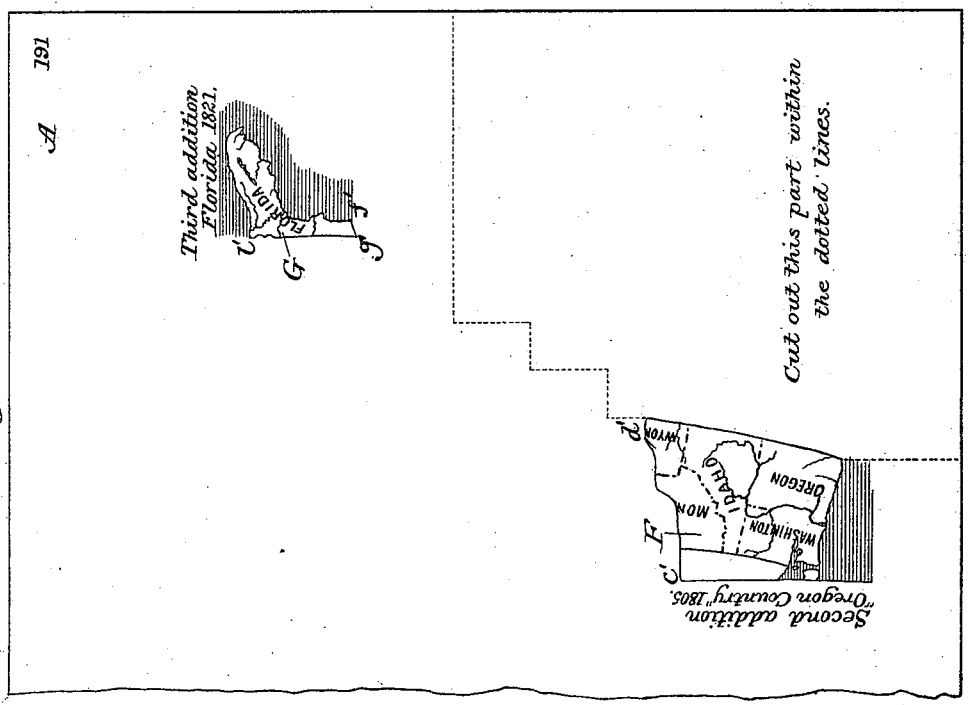
Attest:
A. N. Jesbera
E. M. Watson
Inventor:
Edward Eggleston
By David A. Burr
Atty.

UNITED STATES PATENT OFFICE.

EDWARD EGGLESTON, OF QUEENSBURY, NEW YORK.

MAP.

SPECIFICATION forming part of Letters Patent No. 421,684, dated February 18, 1890.

Application filed September 7, 1889. Serial No. 323,316. (No model.)

*To all whom it may concern:*

Be it known that I, EDWARD EGGLESTON, of the town of Queensbury, in the county of Warren and State of New York, have invented certain new and useful Improvements in Educational Maps; and I do hereby declare that the following is a full and exact description thereof, reference being had to the accompanying drawings, and to the letters of reference marked thereon, making a part of this specification.

My invention relates to an improvement in maps for educational purposes bound in book form, and has for its object to illustrate graphically the territorial growth or expansion of a country or nation, its boundaries at various given epochs, and its progressive increase in size by successive additions through discovery, purchase, conquest, annexation of territory, or by any other means.

It consists in the combination and arrangement in a bound book of a series of sectional maps, all printed upon the first page of each of a succession of leaves in the book, or all upon the reverse pages of such leaves, if preferred, and each representing certain separate parts of a given country or district in manner so that by cutting away so much of each leaf as overlies directly the sectional map on the next leaf in order the next territorial addition to the country or district represented in its original boundaries by the preceding map or maps in the series will be made to appear in its exact connection and relation thereto, the portion of the leaf or page not included in the map thereon and not intended to be cut away being used for the letter-press, all as is hereinafter more fully described and claimed.

In the accompanying drawings, Figure 1 represents the leaf in the book having printed upon its first page the first of a series of sectional maps illustrative of the territorial growth of the United States, and which shows the territory possessed by the United States before 1803. Fig. 2 represents the next succeeding leaf in the book, having printed upon its first page a sectional map showing the territory purchased by the Government in 1803 and constituting the first addition to the United States. Fig. 3 represents the third succeeding leaf, having upon its first page sectional maps of the second and third additions; and Fig. 4 is a view of the book opened at the first page of maps, showing the successive map-bearing leaves, each cut away to permit a suitable portion of the underlying leaf or leaves to appear, and thereby exhibit the additional maps in proper connection with the first.

The book is made up of any required number of leaves A A A, which are bound up in the customary manner.

The first map B of the series, by which the territorial growth of the United States, for example, is to be illustrated, is represented as printed on the upper left-hand corner of page 187. (See Fig. 1.) The portion C of said page extending beyond the lower and right-hand edges $a\ b$ of the map, forming the boundary of the country in the direction of its subsequent extensions, is left blank, with the exception of the directions printed thereon for cutting away the same and of the dotted lines $x\ x\ y\ y$, extending from said edges in each direction to the margin of the page to define clearly the part of the leaf which is to be cut away to bring to view a corresponding portion of the underlying page.

The second map D is printed upon that portion of the first page 189 of the next leaf which corresponds with the blank portion C of the preceding leaf 187, which is marked out for excision by the lines $x\ x$ and $y\ y$ and the intervening edge of the map B. The upper edges $a'\ b'$ of this second map D, which correspond in configuration with the edges $a$ and $b$ of the first map B, are so located upon the page 189 that when the blank portion of page 187 is cut away, as directed, and the page turned down to lie upon said page 189 the edges $a'\ b'$ will correspond and register exactly with the edges $a$ and $b$, and the maps B and D will be thus exactly joined to form a continuation or extension the one of the other, as shown in Fig. 4. The portion E of said page 189 extending beyond the lower and right-hand edge $c\ d\ e\ f$ of the map forming the boundary of the country in the direction of its subsequent extension is left blank, and dotted marginal lines $k\ h$, $i\ j$, and $g\ l\ m$ are printed on the page to define clearly the portion thereof which is to be cut away to bring to view a corresponding portion of the underlying page. The third and fourth maps F and G are in like manner printed upon that portion of the first page of the next leaf in order 191, which corresponds with the blank portion E of the preceding page 189, defined for excision by the dotted lines and the intervening edge $cf$ of the map.

The upper edge $c'd'$ of the map F, showing the second addition to the country, corresponds in its outline with the edge $cd$ of the second map D, and the left-hand edge $g'f'$ of the map G, showing the third addition to the country, corresponds in its outline with the edge $gf$ of said second map D, and the two maps F and G are so located upon the page 191 as that, when the blank portion of page 189 is cut away, as directed, and the page turned down to lie upon said page 191, the corresponding edges of the maps F and D and G and D will exactly join, so that said maps F and G will severally form a continuation of the map D, as shown in Fig. 4. In this manner a succession of sectional maps printed upon successive bound leaves in a book may be made to represent in proper sequence all the successive additions of territory made to any country or nation at different epochs in its history.

So much of each page as is not included in the portion thereof to be cut away and is not occupied with a map may be used for the letter-press relating to the maps, as is illustrated in Fig. 2.

I deem it preferable that the student owning each book thus constructed shall himself cut away the designated blank portion of each leaf in connection with the study of the history accompanying the maps, so as to impress thereby the more fully upon the mind of the scholar the extent and the sequence in chronological order of the several changes in the territorial boundaries of the country.

I am aware that a map or chart has been heretofore published in combination with a series of detached maps representing, severally, portions of the whole territory shown upon the first map, and which, being differently colored, are adapted to be tacked upon said first map by detachable fastenings to indicate territorial changes in the political history of the country. My invention differs therefrom in that the several maps employed are printed in regular order upon the successive leaves of a bound book, so that the maps do not overlie each other and are not superimposed; but as the leaves are turned in natural sequence the sectional maps join each to the other and thereby unite in forming a single map embracing the portions thereof segregated on the successive leaves of the book. The maps do not overlie each other, but are exactly joined along their contiguous edges by the overlying of the adjacent leaves of the book.

I claim as my invention—

1. The combination, in book form, of a series of maps, each representing a different portion of a given country, printed severally upon successive leaves in the book in such order as that the lines indicating the boundary between the territory represented in the maps on any two adjoining leaves shall coincide when the first of said leaves is turned over in normal form upon the second, and when the portion of the first leaf overlying the map on the second leaf is cut away and removed the second map shall normally join the first as an extension thereof, substantially in the manner and for the purpose herein set forth.

2. A series of separate maps representing different sections of a given country, severally bound together in book form, each having the portion thereof which would overlie and cover the sectional map next succeeding it cut away to permit said succeeding map to appear as an extension of the first by an exact juxtaposition and registry of the contiguous edges of the two maps, substantially in the manner and for the purpose herein set forth.

In testimony whereof I have signed my name to this specification in the presence of two subscribing witnesses.

EDWD. EGGLESTON.

Witnesses:
ELWIN SULZE,
MABEL COOKE.